US009165369B1

(12) United States Patent
Zhang et al.

(10) Patent No.: US 9,165,369 B1
(45) Date of Patent: Oct. 20, 2015

(54) MULTI-OBJECT DETECTION AND RECOGNITION USING EXCLUSIVE NON-MAXIMUM SUPPRESSION (ENMS) AND CLASSIFICATION IN CLUTTERED SCENES

(71) Applicant: HRL Laboratories, LLC, Malibu, CA (US)

(72) Inventors: Lei Zhang, Torrance, CA (US); Kyungnam Kim, Oak Park, CA (US); Yang Chen, Westlake Village, CA (US); Deepak Khosla, Camarillo, CA (US); Shinko Y. Cheng, Cupertino, CA (US); Alexander L. Honda, Sunnyvale, CA (US); Changsoo S. Jeong, Rancho Palos, CA (US)

(73) Assignee: HRL Laboratories, LLC, Malibu, CA (US)

( * ) Notice: Subject to any disclaimer, the term of this patent is extended or adjusted under 35 U.S.C. 154(b) by 28 days.

(21) Appl. No.: 14/207,391

(22) Filed: Mar. 12, 2014

Related U.S. Application Data

(60) Provisional application No. 61/784,716, filed on Mar. 14, 2013.

(51) Int. Cl.
   *G06T 7/00* (2006.01)
   *G06K 9/62* (2006.01)

(52) U.S. Cl.
   CPC .............. *G06T 7/0081* (2013.01); *G06K 9/628* (2013.01)

(58) Field of Classification Search
   None
   See application file for complete search history.

(56) References Cited

U.S. PATENT DOCUMENTS

| 2005/0105765 | A1* | 5/2005 | Han et al. ............... 382/100 |
| 2011/0311129 | A1* | 12/2011 | Milanfar et al. ........... 382/154 |
| 2012/0207346 | A1* | 8/2012 | Kohli et al. ............... 382/103 |
| 2014/0247996 | A1* | 9/2014 | Lin et al. ................. 382/218 |
| 2014/0270551 | A1* | 9/2014 | Baranowski et al. ........ 382/226 |

OTHER PUBLICATIONS

Diez Buil, Mikel. "Non-Maxima Supression." (2011).*
M.D. Breitenstein, F. Reichlin, B. Leibe, E. Koller-Meier, and L.J.V. Gool, "Robust tracking-by-detection using a detector confidence particle filter", in Proc. of ICCV, 2009, pp. 1515-1522.

(Continued)

*Primary Examiner* — Samir Ahmed
*Assistant Examiner* — Menatoallah Youssef
(74) *Attorney, Agent, or Firm* — Tope-McKay & Associates

(57) ABSTRACT

Described is a system for multi-object detection and recognition in cluttered scenes. The system receives an image patch containing multiple objects of interest as input. The system evaluates a likelihood of existence of an object of interest in each sub-window of a set of overlapping sub-windows. A confidence map having confidence values corresponding to the sub-windows is generated. A non-maxima suppression technique is applied to the confidence map to eliminate sub-windows having confidence values below a local maximum confidence value. A global maximum confidence value is determined for a sub-window corresponding to a location of an instance of an object of interest in the image patch. The sub-window corresponding to the location of the instance of the object of interest is removed from the confidence map. The system iterates until a predetermined stopping criteria is met. Finally, detection information related to multiple instances of the object of interest is output.

21 Claims, 9 Drawing Sheets

(56) References Cited

OTHER PUBLICATIONS

I. Haritaoglu, D. Harwood and L.S. David, "Hydra: Multiple people detection and tracking using silhouettes", in Proc. of ICIAP, 1999, pp. 280-285.

Gaszczak, Anna; Breckon, Tody P.; Han, Jiwan, "Real-time people and vehicle detection from UAV imagery", in Proceedings of the SPIE, vol. 7878, pp. 78780B-78780B-13 (2011).

A. Vedaldi, V. Gulshan, M. Varma, and A. Zisserman, "Multiple Kernels for Object Detection", in Proceedings of the International Conference on Comupter Vision (ICCV), 2009.

Alexander Neubeck and Luc Van Gool. "Efficient Non-Maximum Suppression", In Proceedings of the 18th International Conference on Patern Recognition—vol. 03 (ICPR '06). vol. 3, IEEE Computer Society, 850-855. 2006.

Navneet Dalal and Bill Triggs in "Histograms of oriented gradients for human detection", In Proceedings of the 2005 IEEE Computer Society Conference on Computer Vision and Pattern Recognition (CVPR'05)—vol. 1—vol. 01 (CVPR '05), vol. 1, IEEE Computer Society, 886-893, 2005.

Bosch et al. in "Image classification using random forests and ferns", In Proc. ICCV, 2007.

* cited by examiner

MULTI-OBJECT DETECTION AND RECOGNITION USING EXCLUSIVE NON-MAXIMUM SUPPRESSION (ENMS) AND CLASSIFICATION IN CLUTTERED SCENES

CROSS-REFERENCE TO RELATED APPLICATIONS

This is a Non-Provisional patent application of U.S. Provisional Application No. 61/784,716, filed in the United States on Mar. 14, 2013, entitled, "Multi-Object Detection and Recognition Using Exclusive Non-Maxima Suppression (eNMS) and Classification in Cluttered Scenes."

GOVERNMENT LICENSE RIGHTS

This invention was made with government support under U.S. Government Contract Number HR0011-10-C-0013 Neovision2. The government has certain rights in the invention.

BACKGROUND OF THE INVENTION (1) Field of Invention

The present invention relates to a system for multi-object detection and recognition in cluttered scenes and, more particularly, to a system for multi-object detection and recognition in cluttered scenes using exclusive non-maxima suppression (eNMS).

(2) Description of Related Art

Object cluttering is a notorious problem in object detection and recognition. Conventional classifiers usually are able to identify if there is an object within an image patch, but cannot tell how many objects are there. Exhaustive sliding window search across the whole image might find multiple objects in cluttered scenarios, but it is usually computationally intensive and slow. Attention-based approaches often cannot separate multiple object instances in cluttered scenarios since they usually find non-tight bounding boxes. Other popular methods also use object tracking to separate and distinguish objects that are cluttered. However, correctly initializing multiple object tracking in cluttered scenarios is a practical challenge, and most tracking approaches cannot deal with static objects.

Non-maxima suppression (NMS) is widely used in object detection; however, it is typically used across the entire image to suppress detections generated by exhaustive sliding window search that have too much overlap. Such exhaustive searching across the entire image is usually computationally intensive and very time consuming.

Breitenstein et al. use a detection-by-tracking methodology which requires explicit object tracking, as described in "Robust tracking-by-detection using a detector confidence particle filter", in Proc. of ICCV, 2009, pp. 1515-1522, which is hereby incorporated by reference as though fully set forth herein. There is also research using the silhouette of cluttered people to separate individual persons, as described by Haritaoglu et al. in "Hydra: multiple people detection and tracking using silhouettes", in Proc. of ICIAP, 1999, pp. 280-285, which is hereby incorporated by reference as though fully set forth herein. Another recent work uses a sliding window search approach and additional thermal imagery for detecting vehicles or people from UAV imagery, which is described by Gaszczak et al. in "Real-time people and vehicle detection from UAV imagery", in Proceedings of the SPIE, Volume 7878, article i.d. 78780B, 2011, which is hereby incorporated by reference as though fully set forth herein.

In general, the aforementioned object detection approaches are often based on traditional classification with global sliding windows or detection-by-tracking methodology. Although multiple object instances may be implicitly detected by searching a large amount of sliding windows across the whole image, such approaches are too time consuming. On the other hand, the tracking based system often suffers from the difficulty of robust tracking.

Thus, a continuing need exists for a method that is computationally efficient and allows for detection and recognition of multiple objects of the same class within selected image portions.

SUMMARY OF THE INVENTION

The present invention relates to a system for multi-object detection and recognition in cluttered scenes and, more particularly, to a system for multi-object detection and recognition in cluttered scenes using exclusive non-maxima suppression (eNMS). The system comprises one or more processors and a memory having instructions such that when the instructions are executed, the one or more processors perform multiple operations. The system receives an image patch of an image as input, wherein the image patch is a portion of the image containing a plurality of objects of interest. A set of overlapping sub-windows in the image patch is determined. A likelihood of existence of an object of interest in each sub-window in the set of overlapping sub-windows is evaluated. A confidence map comprising a plurality of confidence values corresponding to the set of overlapping sub-windows indicating the likelihood of existence of an object of interest in each sub-window in the set of overlapping sub-windows is generated. A non-maxima suppression technique is applied to the confidence map to eliminate sub-windows in the set of overlapping sub-windows having confidence values that are below a determined local maximum confidence value from the confidence map. A global maximum confidence value for a sub-window in the set of overlapping sub-windows which corresponds to a location of an instance of an object of interest in the image patch is determined. The sub-window in the set of overlapping sub-windows that corresponds to the location of the instance of the object of interest in the image patch is removed from the confidence map. The system iterates until a predetermined stopping criteria is met. Finally, detection information related to a plurality of instances of the object of interest in the image patch is output.

In another aspect, binary object classification is performed on the set of overlapping sub-windows.

In another aspect, for each instance in the plurality of instances of the object of interest in the image patch, the detection information comprises a location of the sub-window in the set of overlapping sub-windows containing an object of interest and a corresponding confidence value for the sub-window in the set of overlapping sub-windows containing an object of interest.

In another aspect, after determining the global maximum confidence value, the computer program product further comprises instructions for causing the processor to perform an operation of setting the confidence values within the sub-window in the set of overlapping sub-windows which corresponds to a location of an instance of an object of interest in the image patch to zero, such that the sub-window in the set of overlapping sub-windows which corresponds to a location of an instance of an object of interest in the image patch does not interfere with detection of another instance of the object of interest.

In another aspect, the predetermined stopping criteria comprises stopping the iterating if an area of the confidence map is less than a size of a reference object of interest.

In another aspect, the predetermined stopping criteria comprises stopping the iterating if the global maximum confidence value is lower than a predetermined threshold.

In another aspect, the predetermined stopping criteria comprises stopping the iterating if a predetermined maximum number of instances of objects of interest have been detected.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawing, where.

DETAILED DESCRIPTION

Figure 1:
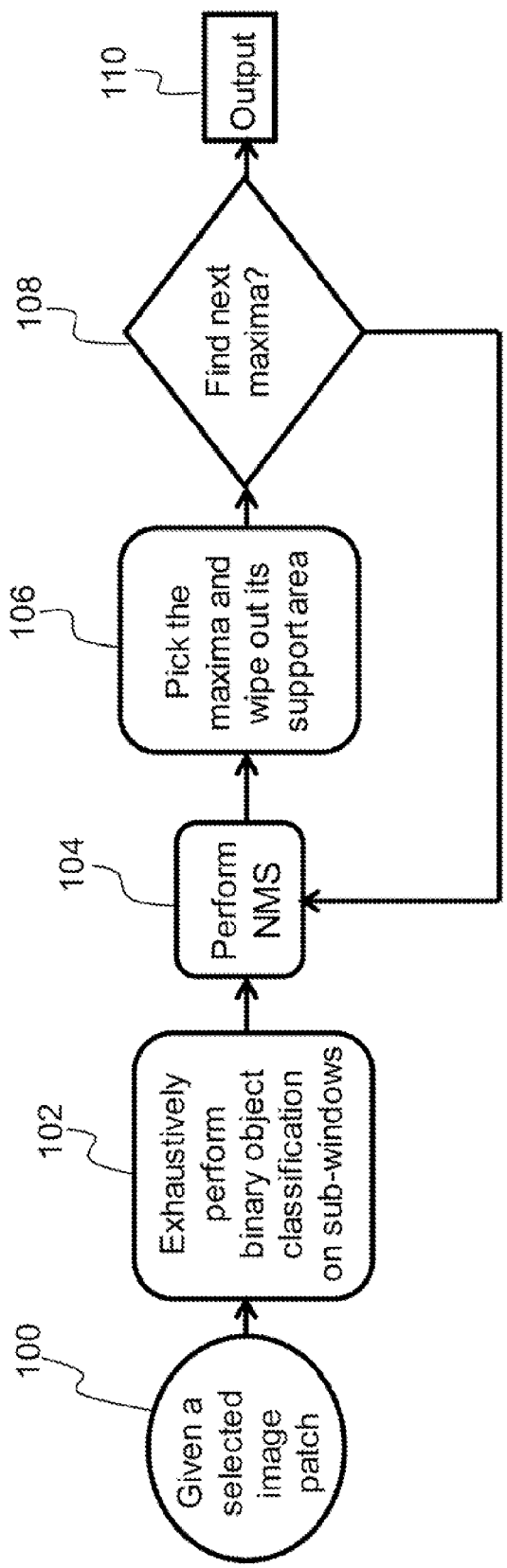
FIG. 1 is a flow diagram depicting exclusive non-maxima suppression (eNMS) multi-object detection according to the principles of the present invention.

The present invention relates to a system for multi-object detection and recognition in cluttered scenes and, more particularly, to a system for multi-object detection and recognition in cluttered scenes using exclusive non-maxima suppression (eNMS). The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for multi-object detection and recognition in cluttered scenes. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for multi-object detection and recognition in cluttered scenes. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(2) Introduction

Object cluttering is a notorious problem in computer vision research. It can cause significant misdetections and incorrect classification. A traditional way to avoid miss detection is an exhaustive sliding window search approach. However, this approach suffers from intensive computation and can be very slow, especially for large images. A better way is to limit the exhaustive sliding window search to certain image areas that have a high likelihood of cluttering. Once such areas (or image patches) are selected, a multi-object detection and recognition method is required to find multiple object instances that potentially exist in the selected image portions.

Described is a multi-object detection/recognition method that combines exclusive non-maxima suppression (eNMS) and modern machine learning techniques for effectively detecting multiple objects of the same class. The method according to the principles of the present invention can be integrated with a bio-inspired attention-based object detection/recognition system to improve overall object recognition performance. One aspect of this method has been implemented and tested on aerial imagery data for validating its effectiveness. Experimental results demonstrated the method described herein could detect multiple persons within selected image patches and significantly improve the detection and recognition rate for a "person" class with a slight increase in false alarm rates (i.e., <1 false positive per image). The same methods can be generalized to detect multiple objects of other classes (e.g., cyclists) by simply replacing the binary classifier for "person" class with another classifier for a different object class.

(3) Specific Details (3.1) System Overview

The complete multi-object detection system according to the principles of the present invention comprises two components: a first pre-process component to find image portions that may contain multiple objects of interests, and a second core process component for multi-object detection within selected image patches. The present invention focuses on the second component and, therefore, assumes the image patch is already selected for multi-object detection.

FIG. 1 illustrates the second core process component for multi-object detection using exclusive non-maxima suppression (eNMS) technique according to the principles of the present invention. Given any selected image area represented as an image patch (depicted as element 100), eNMS first calculates a set of overlapping sub-windows. eNMS then uses a binary object classifier to evaluate the likelihood of object existence in each sub-window (depicted as element 102). In principle, any modern classifier, non-limiting examples of which include Support Vector Machine (SVM), decision forest, or convolutional neural network (CNN), can be used as the scoring function.

Non-maxima suppression (NMS) is then applied on the generated classification probability map to find the true maximum that most likely corresponds to the location of the object of interest (depicted as element 104 in FIG. 1). NMS is a standard technique to suppress non-maximum points near the maximum (peak) point. Here, eNMS refers to iteratively applying NMS and gradually excluding those support areas defined by the previously found maxima. An example of non-maxima suppression is described by Alexander Neubeck and Luc Van Gool in "Efficient non-maximum suppression", In Proceedings of the 18th International Conference on Pattern Recognition, Volume 03 (ICPR '06), Vol. 3. IEEE Computer Society, 850-855, 2006, which is hereby incorporated by reference as though filly set forth herein. Once an object is identified, its support area (i.e., the area enclosed by its corresponding sub-window) is "wiped out" to exclude duplicate object detection (depicted as element 106 in FIG. 1). "Wiped out" refers to setting all of the confidence values within the sub-window to zero so that the area will not interfere with the process of finding the next object. This process is iterated until the stopping criteria (e.g., not enough searching area is left, the maximum number of objects have been found) are met (depicted as element 108 in FIG. 1). In one aspect, the final output is a set of detection boxes that correspond to multiple instances of the objects of interest (depicted as element 110). Additionally, the final output may be a list of records for the detected objects of interest. A detailed description of each of the aforementioned processes is provided below.

(3.2) Selection of Image Areas for Applying eNMS

Selection of appropriate image portions to apply eNMS is a pre-step before applying eNMS for multi-object detection. This step is depicted as element 100 in FIG. 1. In contrast to exhaustive sliding window-based approaches, eNMS is applied only to the selected image areas. It avoids blindly running eNMS across the entire image region and significantly reduces the computational burden. Fully automatic selection of image patches for eNMS is not the main focus of the present invention. Nevertheless, the following is a non-limiting example of a feasible implementation that has been tested in an aspect of the eNMS system for multi-person detection according to the principles of the present invention.

Figure 2:
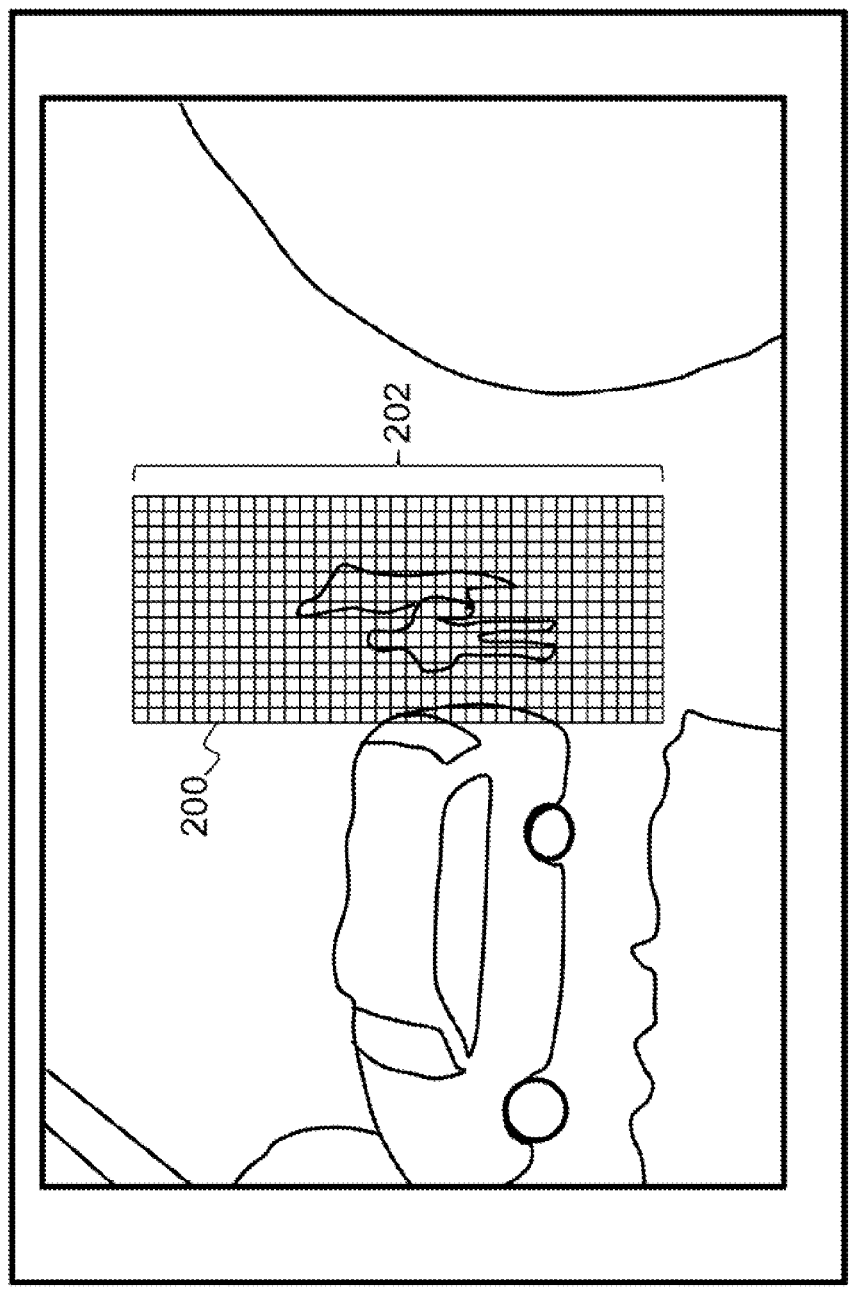
FIG. 2 is an illustration of an example of eNMS for multi-object detection according to the principles of the present invention.

Given an input image, a bio-inspired multi-class object detection and recognition system is used to find different objects of interest. First, the image patches that are recognized as the object class of interest (e.g., person) or a class that may be easily confused with the object class of interest (e.g., cyclist) are selected. In addition, the size (or area) of candidate image patches is restricted. The patch size should not be too small or too large. In general, optimal setting of the object size range is dependent on each specific problem. However, one can leverage the distribution of objects' geometric properties to set appropriate ranges. For instance, the average car's width-to-length ratio (or its aspect ratio from an overhead view) has a range between 0.35 and 0.42. If one is performing detection and classification of cars from images, such a width-to-length ratio range can be used for filtering outliers. Similarly, one can put constraints on many other properties, non-limiting examples of which include width, height, aspect ratio, and shape, provided that there is some a priori knowledge regarding the distribution of these object features. These rules together can quickly select a set of image portions that may be appropriate for eNMS processing. FIG. 2 illustrates an example image processed by eNMS for multi-object detection depicting a set of overlapping sub-windows 200 (depicted as individual rectangles/squares) of a selected image patch 202 (depicted as the entire set of individual rectangles/squares).

Figure 3:
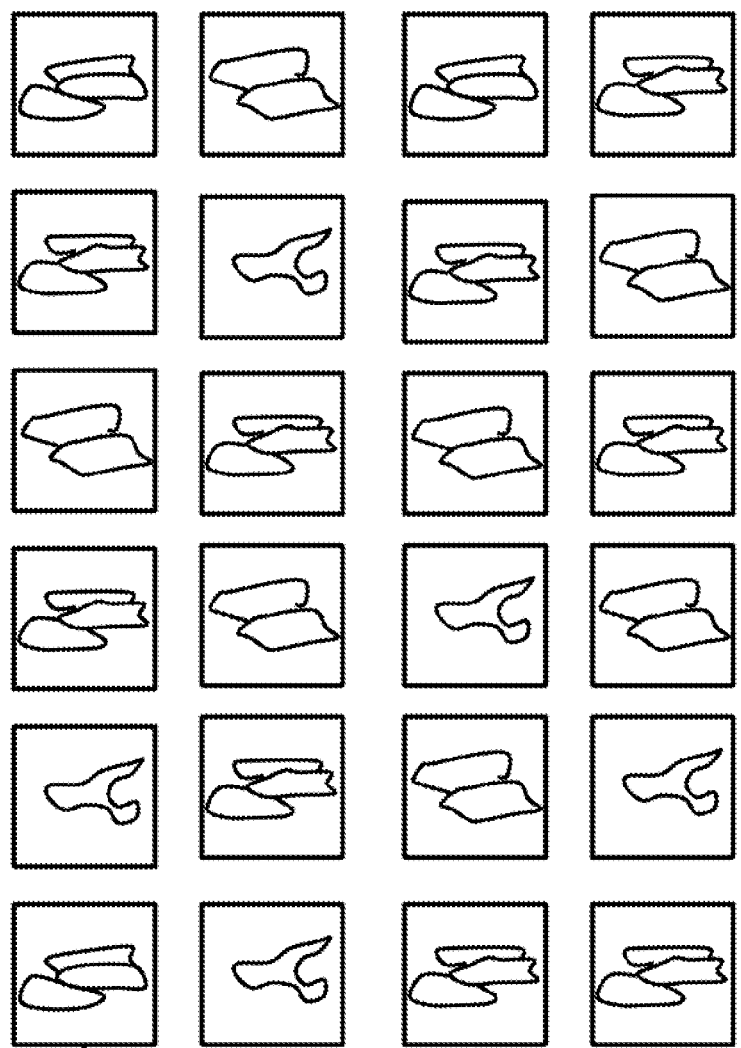
FIG. 3 is an illustration of example image patches selected for eNMS processing according to the principles of the present invention.

FIG. 3 illustrates an example of selected image patches 202 by the above method from a video sequence. Most selected image patches contain multiple objects of interest (e.g., persons). eNMS will only be applied to these selected image portions for better computation efficiency. If there are still incorrectly selected image patches, an optional human intervention process can be added to manually remove those patches before applying eNMS.

(3.3) Binary Object Classification Using Modern Classification Techniques

Once an image patch is selected, binary object classification is applied on the selected image patch to find multiple objects. The first step is performing binary object classification, as represented by element 102 in FIG. 1. Binary object classification requires a technique that can generate a score indicating whether the object of interest exists at a location and how likely it is. This problem is treated as a standard pattern classification problem. In principle, any binary classifier can be used here, as long as it can generate a score to indicate the confidence level of existence of the object. In the modern machine learning domain, there are many choices that can meet this requirement, such as Support Vector Machines (SVMs), probabilistic decision forests, neural networks, Bayesian networks, and convolutional neural networks (CNNs).

In one aspect of the eNMS system according to the principles of the present invention, a powerful modern classification technique, multiple kernel learning (MKL), was adopted for the binary classification task. MKL is described by M. D. Breitenstein, F. Reichlin, B. Leibe, E. Koller-Meier, and L. J. V. Gool in "Robust tracking-by-detection using a detector confidence particle filter", in Proc. of ICCV, 2009, pp. 1515-1522, which is hereby incorporated by reference as though filly set forth herein. The MKL classifier is basically a SVM classifier whose kernel is a linear combination of multiple given base kernels. It defines a function $C(h^R)$ that estimates the likelihood of the candidate region R containing an instance of the object of interest, where $h^R=\{h_{fl}^R\}$ is a collection of feature histograms for multiple feature channels f and spatial pyramid levels l. MKL technique learns both the optimal combination of kernels and the features to achieve the best classifier. Mathematically, the scoring function $C(h^R)$ is defined according to the following:

$$C(h^R)=\Sigma_{i=1}^M \gamma_i \alpha_i K(h^R,h^i),$$

where $h^i$ is the descriptors of M representative training regions (also known as support vectors) selected by SVM and $\gamma_i \in \{+1,-1\}$ is the binary class label. $\alpha_i$ is the linear weight and K is a positive definite kernel, which is a linear combination of histogram kernels:

$$K(h^R,h^i)=\Sigma_{fl} d_{fl} K(h_{fl}^R, h_{fl}^i).$$

MKL learns the coefficients $\alpha_i$ and the kernel combination weights $\{d_{fl}\}$ to maximally leverage the combination of different features and multiple base kernels to achieve the best classification performance.

In one aspect of the eNMS system for multi-object detection according to the principles of the present invention, two set of histogram-based features were used: Histogram of Oriented Edges (HOG) and dense SIFT features (PHOW). An example of HOG is described by Navneet Dalal and Bill Triggs in "Histograms of oriented gradients for human detection", In Proceedings of the 2005 IEEE Computer Society Conference on Computer Vision and Pattern Recognition (CVPR'05)—Volume 1-Volume 01 (CVPR '05), Vol. 1. IEEE Computer Society, 886-893, 2005, which is hereby incorporated by reference as though fully set forth herein. An example of PHOW is described by Bosch et al. in "Image classification using random forests and fems", In Proc. ICCV, 2007, which is hereby incorporated by reference as though fully set forth herein.

To simplify learning the system, two base kernels were empirically selected through preliminary experiments: a quasi-linear kernel and a non-linear kernel. The quasi-linear kernel is used with HOG features and defined as $$K(h,h^i)=\frac{1}{2}(1-\chi^2(h,h^i)),$$

where h is the histogram feature vector and $\chi^2$ is the traditional Chi-square function.

The non-linear kernel is used with PHOW features and defined as:

$$K(h,h^i)=e^{-\gamma \chi^2(h,h^i)},$$

where $\gamma$ is a parameter to be learned during training.

The optimal weights combining different features and different base kernels are automatically learned through the MKL technique using an annotated training set. The learned MKL classifier was used to generate the score of object detection for the following eNMS process.

(3.4) Iterative Exclusive Non-Maxima Suppression (eNMS)

After selecting the image area to apply eNMS (depicted as element 100 in FIG. 1) and training the binary object classifier (depicted as element 102 in FIG. 1), NMS is performed on the selected image area for multi-object detection (depicted as element 104 in FIG. 1). The eNMS iterative process includes 104, 106 and 108. For eNMS, one first needs to generate a confidence map that shows the likelihood of existence of the object of interest in the selected image area (i.e., image patch). It is usually unnecessary to densely search over the image patch to generate the confidence map using the trained binary classifier. The knowledge about the object's typical width and height is leveraged for automatically choosing appropriate horizontal and vertical intervals for deciding the sub-windows for object classification. Such class-specific knowledge is often readily available based on the physical dimension of a typical object (e.g., a car), the rough distance from the object to the camera, and the projection angle. In addition, a user can manually estimate the sizes of an object in a few frames in order to roughly know the range of the object's dimension. Such an approach is often sufficient enough for dealing with objects with less intra-class variation of sizes.

Once the reference object size is known, the horizontal and vertical intervals of the sub-windows are determined by a ratio to the object's width or height. The binary classifier is then used to estimate the confidence score of existence of the object in each sub-window. This process generates a sparse confidence map for object detection. Non-maxima suppression is then applied on this confidence map to eliminate local non-maxima. This is achieved by a local non-maxima filter. The filtering window size is defined as the same as the reference object size. For non-maxima suppression, any location whose confidence value is lower than the maximum value in the filtering window is deemed as non-maxima and removed. Mathematically, this process can be expressed as the following:

$$C(x,y,[m\ n])=0 \text{ if } C(x,y)<\max(C([m\ n])).$$

where $C([m\ n])$ denotes the confidence scores within the filter range (i.e., a window centered at (x,y) with [m n] as its dimensions).

The above process will preserve a few peak points in the confidence map. One can then find the one with the global maximum confidence value and declare it as the found location of the object. The corresponding sub-window area is wiped out (i.e., all confidence values within this window are set as 0, so that the wiped-out area will not interfere with the process of finding the next object). This step is depicted as element 106 in FIG. 1. The remaining confidence map is used to find the next object of interest by iteratively running the above eNMS process. The whole process is stopped when the area of remaining confidence map is smaller than the size of the reference object, or the maximum confidence score is lower than a threshold, or a preset maximum number (N) of objects are already found by eNMS (this step is depicted as element 108 in FIG. 1). In this way, the system has the capability to adaptively find different number of objects from the image patches.

Finally, once eNMS meets the stopping criteria, it outputs a list of records for the detected objects of interest (depicted as element 110 in FIG. 1). Each record gives the location of the sub-window that contains the object and also its associated confidence score that is produced by the binary object classifier.

(3.5) Experimental Results

Figure 4A:
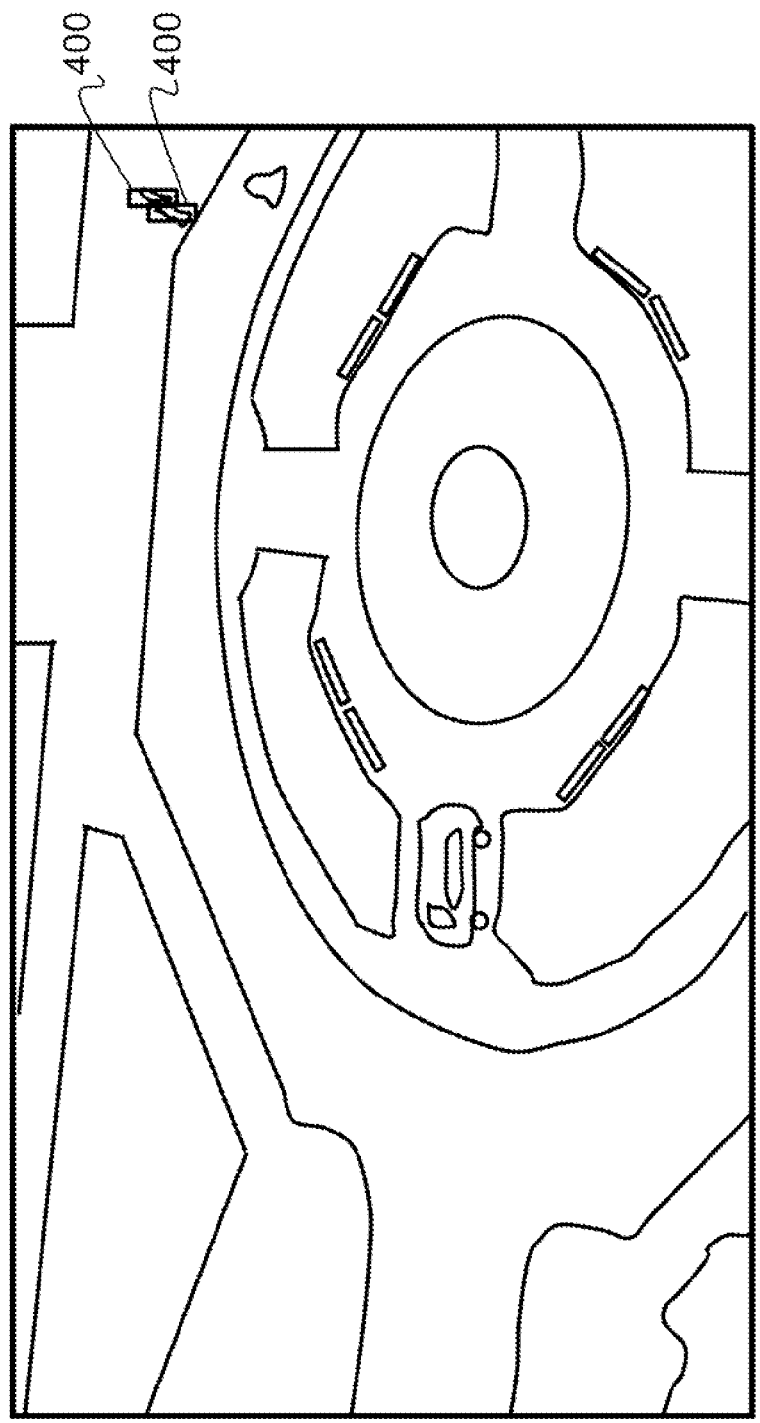
FIG. 4A is an illustration of a first example result of eNMS processing for multi-person detection according to the principles of the present invention.
Figure 4B:
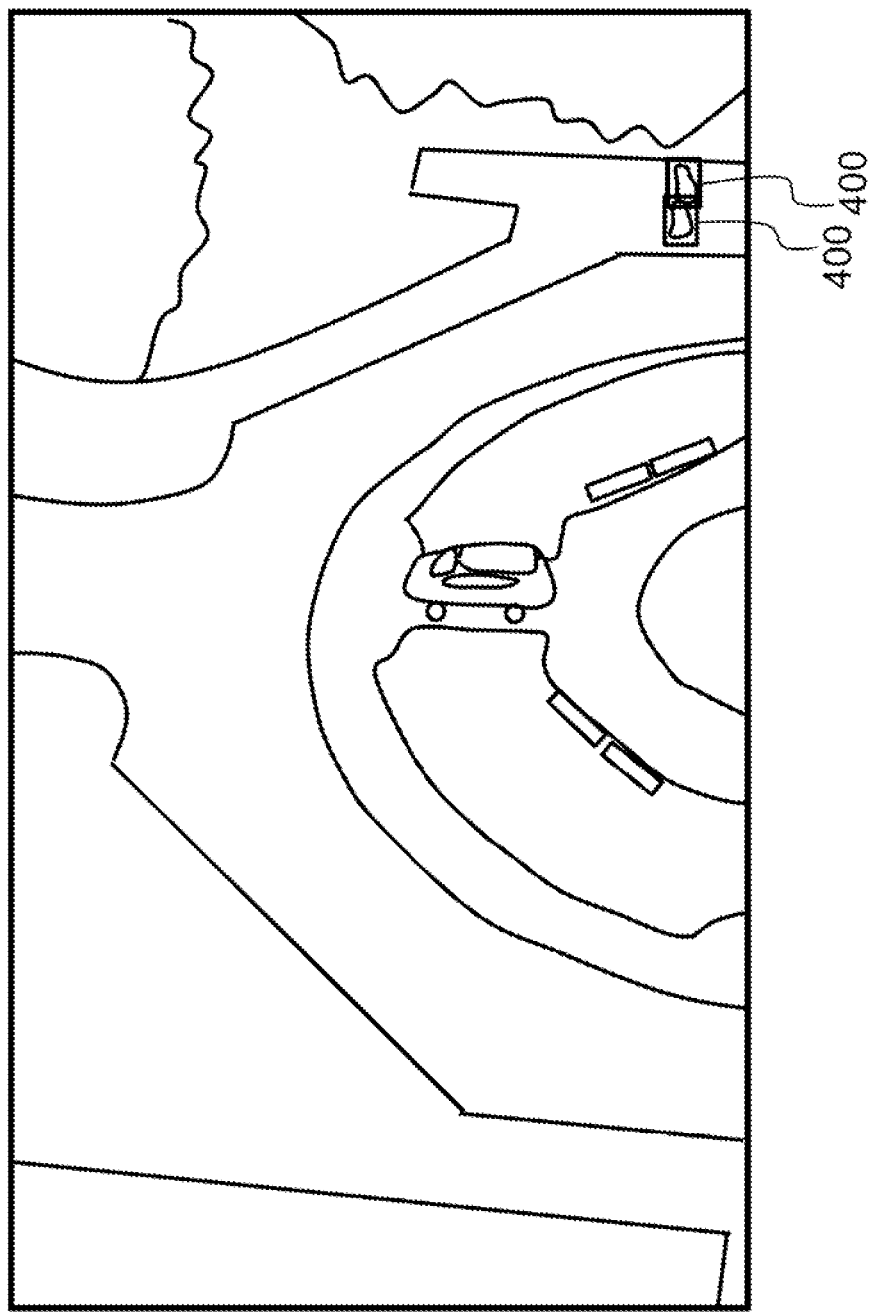
FIG. 4B is an illustration of a second example result of eNMS processing for multi-person detection according to the principles of the present invention.

In one aspect of the aforementioned technique, an eNMS system for multi-person detection from aerial images was implemented. A binary person classifier was trained using the MKL technique from 6000 pieces of positive training data (i.e., an image patch containing a person) and 6000 pieces of negative training data (i.e., an image patch containing no persons). For the testing dataset, the maximum number of persons that could possibly be found by eNMS from each selected image patch was limited to 3 (i.e., N=3). FIGS. 4A and 4B show two examples of eNMS results for multi-person detection. One can see eNMS successfully detects the cluttered persons, which are outlined by boxes 400. For clarity, the separable person detection is not shown.

Figure 5A:
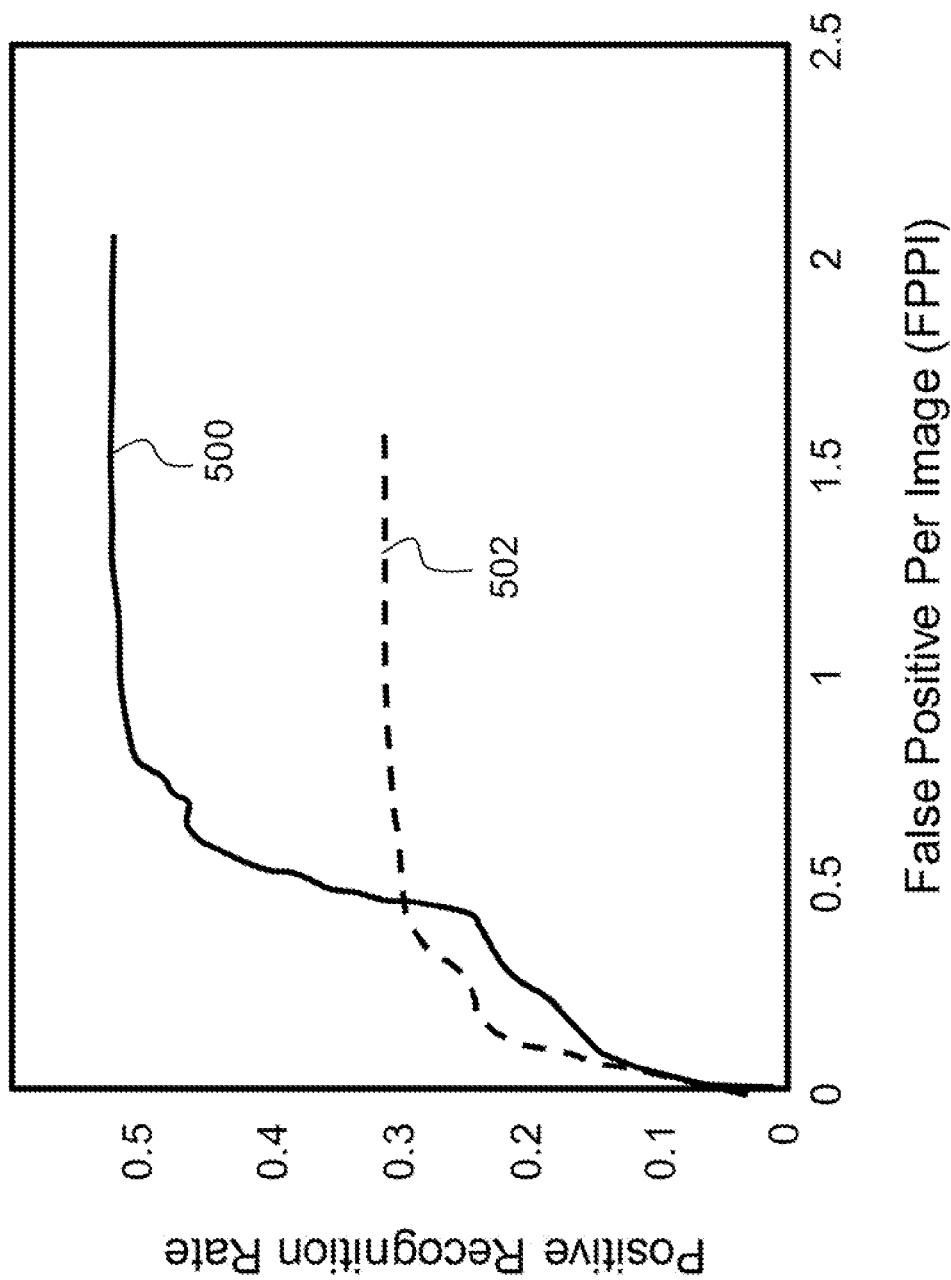
FIG. 5A is an illustration of ROC curves for a first image sequence before and after eNMS processing for person detection and recognition according to the principles of the present invention.
Figure 5B:
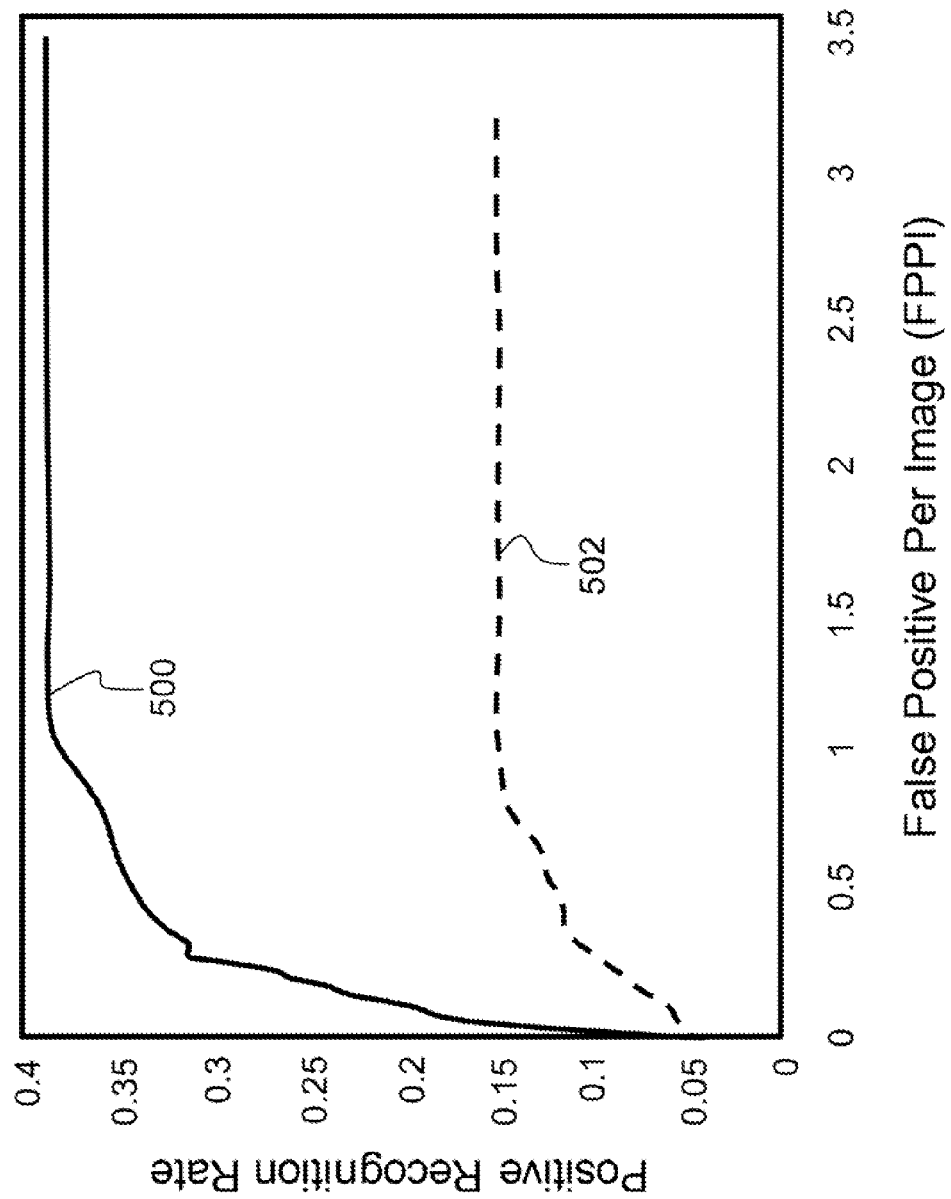
FIG. 5B is an illustration of ROC curves for a second image sequence before and after eNMS processing for person detection and recognition according to the principles of the present invention.

To quantitatively evaluate the effectiveness of eNMS for multi-object detection, the receiver operating characteristic (ROC) curves on different testing sequences were calculated. Each sequence had 900 image frames, some of which contained cluttered persons. The detection rate of person class was evaluated by comparing the detection and recognition results to the ground truth annotation. FIGS. 5A and 5B depict two typical ROC curves on two testing video sequences. In each of the figures, a solid line curve 500 corresponds to the ROC curve after eNMS processing, while a dotted line curve 502 is the ROC curve before eNMS processing.

It was observed that the person recognition rates were significantly improved. For example, in FIG. 5A, the person recognition rate was increased from 31.2% to 52.2% after applying eNMS processing. The false alarm per image (FPPI) rate was only slightly increased (i.e., less than 1 FPPI). In FIG. 4B, the person recognition rate was increased from 15.2% to 38.9% after applying eNMS. The false alarm per image (FPPI) was only slightly increased (i.e., less than 1 FPPI), as well. These results demonstrated the effectiveness of eNMS processing for multi-object detection and recognition.

Finally, although a MKL classifier was used in the aspect described for the eNMS system, the system design allows for the use of other types of modern classification techniques, such as convolutional neural networks (CNNs). While CNNs were not tested, it is expected that the improvement by eNMS processing would be similar to the MKL classifier results. In addition, the system described herein can be easily generalized to deal with other object detection problems. For instance, if one wants to detect multiple cars from a cluttered image patch, one can train a binary classifier for cars using the same process. In short, the same technology can be applied to deal with any type of multi-object detection problem by simply replacing the binary classifier.

Figure 6:
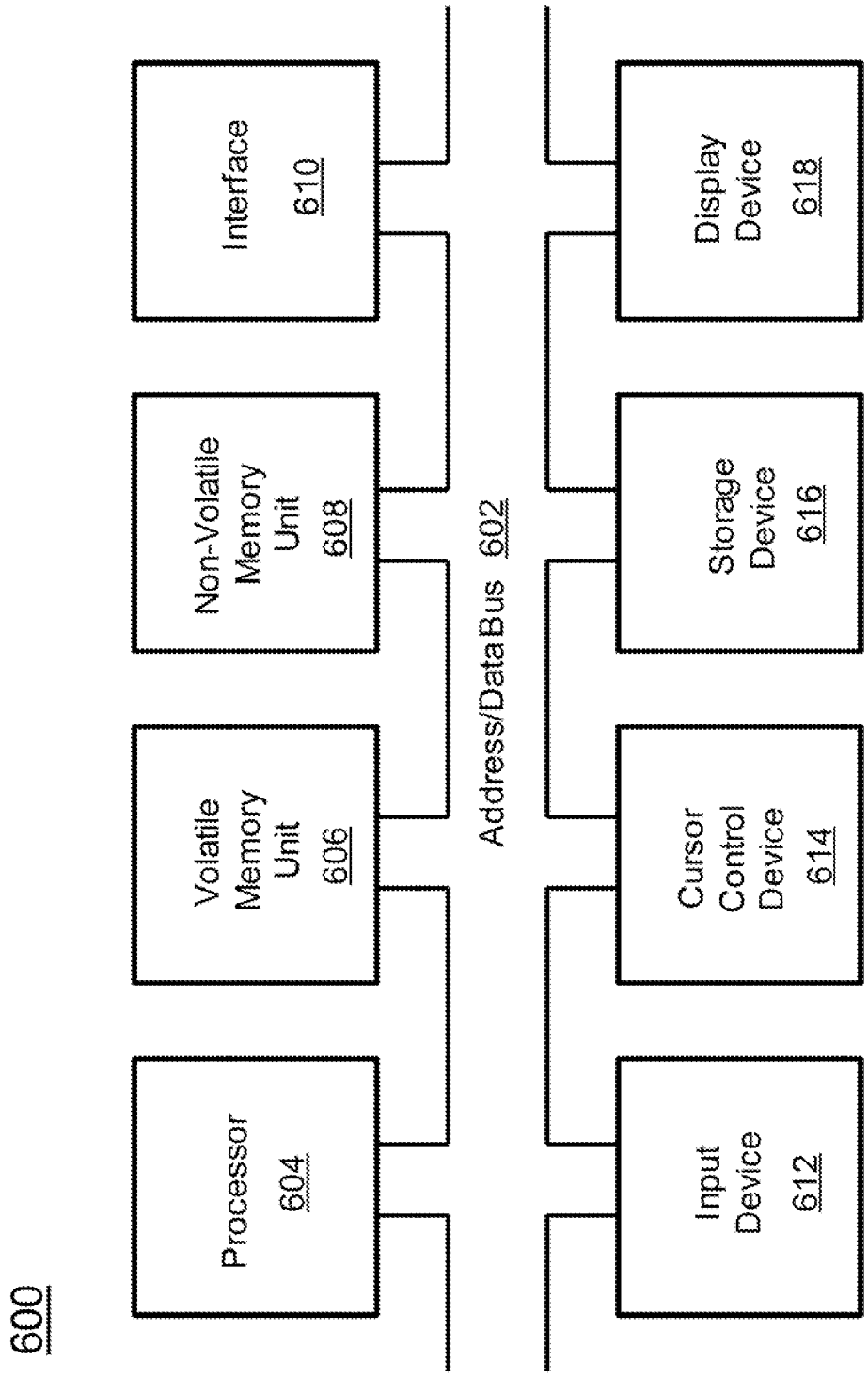
FIG. 6 is an illustration of a data processing system according to the principles of the present invention.

An example of a computer system 600 in accordance with one aspect is shown in FIG. 6. The computer system 600 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 600. When executed, the instructions cause the computer system 600 to perform specific actions and exhibit specific behavior, such as described herein.

The computer system 600 may include an address/data bus 602 that is configured to communicate information. Additionally, one or more data processing units, such as a processor 604, are coupled with the address/data bus 602. The processor 604 is configured to process information and instructions. In one aspect, the processor 604 is a microprocessor. Alternatively, the processor 604 may be a different type of processor such as a parallel processor, or a field programmable gate array.

The computer system 600 is configured to utilize one or more data storage units. The computer system 600 may include a volatile memory unit 606 (e.g., random access memory ("RAM"), static RAM, dynamic RAM, etc.) coupled with the address/data bus 602, wherein a volatile memory unit 606 is configured to store information and instructions for the processor 604. The computer system 600 further may include a non-volatile memory unit 608 (e.g., read-only memory ("ROM"), programmable ROM ("PROM"), erasable programmable ROM ("EPROM"), electrically erasable programmable ROM "EEPROM"), flash memory, etc.) coupled with the address/data bus 602, wherein the non-volatile memory unit 608 is configured to store static information and instructions for the processor 604. Alternatively, the computer system 600 may execute instructions retrieved from an online data storage unit such as in "Cloud" computing. In an embodiment, the computer system 600 also may include one or more interfaces, such as an interface 610, coupled with the address/data bus 602. The one or more interfaces are configured to enable the computer system 600 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 600 may include an input device 612 coupled with the address/data bus 602, wherein the input device 612 is configured to communicate information and command selections to the processor 600. In accordance with one aspect, the input device 612 is an alphanumeric input device, such as a keyboard, that may include alphanumeric and/or function keys. Alternatively, the input device 612 may be an input device other than an alphanumeric input device. In one aspect, the computer system 600 may include a cursor control device 614 coupled with the address/data bus 602, wherein the cursor control device 614 is configured to communicate user input information and/or command selections to the processor 600. In one aspect, the cursor control device 614 is implemented using a device such as a mouse, a track-ball, a track-pad, an optical tracking device, or a touch screen. The foregoing notwithstanding, in one aspect, the cursor control device 614 is directed and/or activated via input from the input device 612, such as in response to the use of special keys and key sequence commands associated with the input device 612. In an alternative aspect, the cursor control device 614 is configured to be directed or guided by voice commands.

In one aspect, the computer system 600 further may include one or more optional computer usable data storage devices, such as a storage device 616, coupled with the address/data bus 602. The storage device 616 is configured to store information and/or computer executable instructions. In one aspect, the storage device 616 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 618 is coupled with the address/data bus 602, wherein the display device 618 is configured to display video and/or graphics. In one aspect, the display device 618 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 600 presented herein is an example computing environment in accordance with one aspect. However, the non-limiting example of the computer system 600 is not strictly limited to being a computer system. For example, one aspect provides that the computer system 600 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 7:
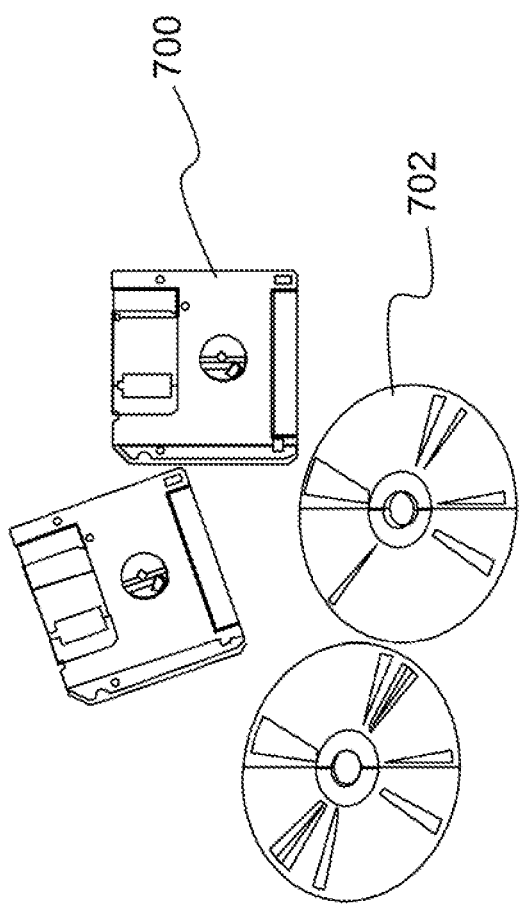
FIG. 7 is an illustration of a computer program product according to the principles of the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer readable code (i.e., instruction means or instructions) stored on any compatible non-transitory computer readable medium.

What is claimed is:

1. A system for multi-object detection and recognition, the system comprising:
   one or more processors and a non-transitory computer-readable medium having executable instructions encoded thereon such that when executed, the one or more processors perform operations of:
   (a) receiving an image patch of an image as input, wherein the image patch is a portion of the image containing a plurality of objects of interest;
   (b) determining a set of overlapping sub-windows in the image patch;
   (c) evaluating a likelihood of existence of an object of interest in each sub-window in the set of overlapping sub-windows;
   (d) generating a confidence map comprising a plurality of confidence values corresponding to the set of overlapping sub-windows indicating the likelihood of existence of an object of interest in each sub-window in the set of overlapping sub-windows;
   (e) applying a non-maxima suppression technique to the confidence map to eliminate sub-windows in the set of overlapping sub-windows having confidence values that are below a determined local maximum confidence value from the confidence map;
   (f) determining a global maximum confidence value for a sub-window in the set of overlapping sub-windows which corresponds to a location of an instance of an object of interest in the image patch;
   (g) removing the sub-window in the set of overlapping sub-windows that corresponds to the location of the instance of the object of interest in the image patch from the confidence map;
   (h) repeating operations (e) through (g) until a predetermined stopping criteria is met; and
   (i) outputting detection information related to a plurality of instances of the object of interest in the image patch.

2. The system as set forth in claim 1, wherein the one or more processors further perform an operation of performing binary object classification on the set of overlapping sub-windows.

3. The system as set forth in claim 2, wherein for each instance in the plurality of instances of the object of interest in the image patch, the detection information comprises a location of the sub-window in the set of overlapping sub-windows containing an object of interest and a corresponding confidence value for the sub-window in the set of overlapping sub-windows containing an object of interest.

4. The system as set forth in claim 3, wherein after determining the global maximum confidence value, the one or more processors further perform an operation of setting the confidence values within the sub-window in the set of overlapping sub-windows which corresponds to a location of an instance of an object of interest in the image patch to zero, such that the sub-window in the set of overlapping sub-windows which corresponds to a location of an instance of an object of interest in the image patch does not interfere with detection of another instance of the object of interest.

5. The system as set forth in claim 4, wherein the predetermined stopping criteria comprises stopping the iterating if an area of the confidence map is less than a size of a reference object of interest.

6. The system as set forth in claim 4, wherein the predetermined stopping criteria comprises stopping the iterating if the global maximum confidence value is lower than a predetermined threshold.

7. The system as set forth in claim 4, wherein the predetermined stopping criteria comprises stopping the iterating if a predetermined maximum number of instances of objects of interest have been detected.

8. A computer-implemented method for multi-object detection and recognition, comprising an act of:
   causing one or more processors to execute instructions stored on a non-transitory memory such that upon execution, the one or more processors performs operations of:
   (a) receiving an image patch of an image as input, wherein the image patch is a portion of the image containing a plurality of objects of interest;
   (b) determining a set of overlapping sub-windows in the image patch;
   (c) evaluating a likelihood of existence of an object of interest in each sub-window in the set of overlapping sub-windows;
   (d) generating a confidence map comprising a plurality of confidence values corresponding to the set of overlapping sub-windows indicating the likelihood of existence of an object of interest in each sub-window in the set of overlapping sub-windows;
   (e) applying a non-maxima suppression technique to the confidence map to eliminate sub-windows in the set of overlapping sub-windows having confidence values that are below a determined local maximum confidence value from the confidence map;

(f) determining a global maximum confidence value for a sub-window in the set of overlapping sub-windows which corresponds to a location of an instance of an object of interest in the image patch;

(g) removing the sub-window in the set of overlapping sub-windows that corresponds to the location of the instance of the object of interest in the image patch from the confidence map;

(h) repeating operations (e) through (g) until a predetermined stopping criteria is met; and (i) outputting detection information related to a plurality of instances of the object of interest in the image patch.

9. The method as set forth in claim 8, wherein the data processor further performs an operation of performing binary object classification on the set of overlapping sub-windows.

10. The method as set forth in claim 9, wherein for each instance in the plurality of instances of the object of interest in the image patch, the detection information comprises a location of the sub-window in the set of overlapping sub-windows containing an object of interest and a corresponding confidence value for the sub-window in the set of overlapping sub-windows containing an object of interest.

11. The method as set forth in claim 10, wherein after determining the global maximum confidence value, the data processor further performs an operation of setting the confidence values within the sub-window in the set of overlapping sub-windows which corresponds to a location of an instance of an object of interest in the image patch to zero, such that the sub-window in the set of overlapping sub-windows which corresponds to a location of an instance of an object of interest in the image patch does not interfere with detection of another instance of the object of interest.

12. The method as set forth in claim 11, wherein the predetermined stopping criteria comprises stopping the iterating if an area of the confidence map is less than a size of a reference object of interest.

13. The method as set forth in claim 11, wherein the predetermined stopping criteria comprises stopping the iterating if the global maximum confidence value is lower than a predetermined threshold.

14. The method as set forth in claim 11, wherein the predetermined stopping criteria comprises stopping the iterating if a predetermined maximum number of instances of objects of interest have been detected.

15. A computer program product for multi-object detection and recognition, the computer program product comprising computer-readable instructions stored on a non-transitory computer-readable medium that are executable by a computer having a processor for causing the processor to perform operations of:

(a) receiving an image patch of an image as input, wherein the image patch is a portion of the image containing a plurality of objects of interest;

(b) determining a set of overlapping sub-windows in the image patch;

(c) evaluating a likelihood of existence of an object of interest in each sub-window in the set of overlapping sub-windows;

(d) generating a confidence map comprising a plurality of confidence values corresponding to the set of overlapping sub-windows indicating the likelihood of existence of an object of interest in each sub-window in the set of overlapping sub-windows;

(e) applying a non-maxima suppression technique to the confidence map to eliminate sub-windows in the set of overlapping sub-windows having confidence values that are below a determined local maximum confidence value from the confidence map;

(f) determining a global maximum confidence value for a sub-window in the set of overlapping sub-windows which corresponds to a location of an instance of an object of interest in the image patch;

(g) removing the sub-window in the set of overlapping sub-windows that corresponds to the location of the instance of the object of interest in the image patch from the confidence map;

(h) repeating operations (e) through (g) until a predetermined stopping criteria is met; and (i) outputting detection information related to a plurality of instances of the object of interest in the image patch.

16. The computer program product as set forth in claim 15, further comprising instructions for causing the processor to perform an operation of performing binary object classification on the set of overlapping sub-windows.

17. The computer program product as set forth in claim 16, wherein for each instance in the plurality of instances of the object of interest in the image patch, the detection information comprises a location of the sub-window in the set of overlapping sub-windows containing an object of interest and a corresponding confidence value for the sub-window in the set of overlapping sub-windows containing an object of interest.

18. The computer program product as set forth in claim 17, wherein after determining the global maximum confidence value, the computer program product further comprises instructions for causing the processor to perform an operation of setting the confidence values within the sub-window in the set of overlapping sub-windows which corresponds to a location of an instance of an object of interest in the image patch to zero, such that the sub-window in the set of overlapping sub-windows which corresponds to a location of an instance of an object of interest in the image patch does not interfere with detection of another instance of the object of interest.

19. The computer program product as set forth in claim 18, wherein the predetermined stopping criteria comprises stopping the iterating if an area of the confidence map is less than a size of a reference object of interest.

20. The computer program product as set forth in claim 18, wherein the predetermined stopping criteria comprises stopping the iterating if the global maximum confidence value is lower than a predetermined threshold.

21. The computer program product as set forth in claim 18, wherein the predetermined stopping criteria comprises stopping the iterating if a predetermined maximum number of instances of objects of interest have been detected.

* * * * *